United States Patent
Kermany et al.

(10) Patent No.: US 10,915,711 B2
(45) Date of Patent: Feb. 9, 2021

(54) NUMERICAL REPRESENTATION IN NATURAL LANGUAGE PROCESSING TECHNIQUES

(71) Applicant: International Business Machines Corporation, Armonk, NY (US)

(72) Inventors: Einat Kermany, Manof (IL); Guy Hadash, Haifa (IL); George Kour, Tel Aviv (IL); Ofer Lavi, Tel Aviv (IL); Boaz Carmeli, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 16/214,082

(22) Filed: Dec. 9, 2018

(65) Prior Publication Data

US 2020/0184015 A1 Jun. 11, 2020

(51) Int. Cl.
*G06F 40/30* (2020.01)
*G06N 3/04* (2006.01)
*G06N 3/08* (2006.01)

(52) U.S. Cl.
CPC ............ *G06F 40/30* (2020.01); *G06N 3/04* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 5,680,627 | A * | 10/1997 | Anglea | G06N 3/04 704/1 |
| 9,165,243 | B2 | 10/2015 | Yu et al. | |
| 9,740,680 | B1 | 8/2017 | Mikolov et al. | |
| 2014/0229158 | A1* | 8/2014 | Zweig | G06N 3/08 704/9 |
| 2016/0180151 | A1* | 6/2016 | Philbin | G06K 9/6218 382/118 |

FOREIGN PATENT DOCUMENTS

| | | |
|---|---|---|
| CN | 103247169 | 12/2017 |
| WO | 2016134183 | 8/2016 |

OTHER PUBLICATIONS

Wang, Y., Liu, X., & Shi, S. (Sep. 2017). Deep neural solver for math word problems. In Proceedings of the 2017 Conference on Empirical Methods in Natural Language Processing (pp. 845-854). (Year: 2017).*

(Continued)

*Primary Examiner* — Edgar X Guerra-Erazo
(74) *Attorney, Agent, or Firm* — Barry D. Blount

(57) ABSTRACT

In some examples, a system for executing natural language processing techniques can include a processor to detect text comprising a word and a number. The processor can also embed, via a word embedding model, the word into a first vector of a vector space and embed the number by converting the number into a second vector of the vector space. Additionally, the processor can train a deep neural network to execute instructions based on the first embedded vector of the word and the second embedded vector of the number. Furthermore, the processor can process an instruction based on the trained deep neural network.

17 Claims, 5 Drawing Sheets

(56) References Cited

OTHER PUBLICATIONS

Piotr Bojanowski et al., "Enriching Word Vectors with Subword Information", arXiv, Jun. 19, 2017.
Wojciech Zaremba et al., "Learning to Execute", arXiv, Dec. 21, 2014.
Prof. W. Kahan, "Lecture Notes on the Status of IEEE Standard 754 for Binary Floating-Point Arithmetic", Lecture Notes on the Status of IEEE 754, Oct. 1, 1997.
Wang Ling et al., "Program Induction by Rationale Generation: Learning to Solve and Explain AlgebraicWord Problems", Proceedings of the 55th Annual Meeting of the Association for Computational Linguistics, 2017, pp. 158-167.
Andrew Trask et al., "Neural Arithmetic Logic Units", arXiv, Aug. 1, 2018.
Keras-team/keras, Aug. 17, 2015, last modified Oct. 4, 2018. available at: https://github.com/keras-team/keras/blob/master/examples/addition_rnn.py (retrieved Dec. 9, 2018).
blog.mycodepilot.com, "Char2vec—Character embeddings for word similarity", Dec. 27, 2017. Available at: https://blog.mycodepilot.com/2017/12/27/char2vec-character-embeddings-for-word-similarity/ (retrieved Dec. 9, 2018).

\* cited by examiner

NUMERICAL REPRESENTATION IN NATURAL LANGUAGE PROCESSING TECHNIQUES

BACKGROUND

The present disclosure relates to executing instructions with natural language processing techniques, and more specifically, but not exclusively, to executing instructions based on numerical representations classified by natural language processing techniques.

SUMMARY

According to an embodiment described herein, a system for executing natural language processing techniques can include a processor to detect text comprising a word and a number. The processor can also embed, via a word embedding model, the word into a first vector of a vector space and embed, via a number embedding model, the number by converting the number into a second vector of the vector space. Additionally, the processor can train a deep neural network to execute instructions based on the first embedded vector of the word and the second embedded vector of the number. Furthermore, the processor can process an instruction based on the trained deep neural network.

In some embodiments, a method for executing natural language processing techniques can include detecting text comprising a plurality of words and a plurality of numbers and embedding, via a word embedding model, each of the words in separate word related vectors of a vector space. The method can also include embedding, via a number embedding model, each of the numbers in separate number related vectors of the vector space. Additionally, the method can include training a deep neural network to execute instructions based on the word related vectors and the number related vectors. Furthermore, the method can include processing an instruction based on the trained deep neural network.

In yet another embodiment, a computer program product for executing natural language processing techniques can include a computer readable storage medium having program instructions embodied therewith, wherein the computer readable storage medium is not a transitory signal per se. The program instructions can be executable by a processor to cause the processor to detect text comprising a word and a number, embed, via a word embedding model, the word into a first vector of a vector space, and embed the number by converting the number into a second vector of the vector space. Additionally, the program instructions can be executable by a processor to cause the processor to train a deep neural network to execute instructions based on the first embedded vector of the word and the second embedded vector of the number. Furthermore, the program instructions can be executable by a processor to cause the processor to process an instruction based on the trained deep neural network.

DETAILED DESCRIPTION

Machine learning techniques related to natural language processing can analyze and process natural language data such as words, numbers, and the like. Statistical inferences can be used by machine learning techniques to identify heuristic rules from natural language data such as documents. However, current machine learning techniques cannot fully process and analyze numerical representations. For example, current techniques represent numbers as the numbers appear in natural language data or replace the numbers with a token. These techniques have a large range of prediction of a numerical value between negative infinity and positive infinity. Furthermore, using a placeholder technique to substitute each number with a number placeholder does not enable number manipulation by a neural network.

In embodiments described herein, a neural network can analyze and process numbers and words interchangeably. Furthermore, embodiments herein change a number prediction problem from regression to classification and add noise resistance to the number prediction problem. Specifically, the techniques described herein can enable embedding numbers and words within the same vector space and dimensions, such as a float normalized vector with three hundred values between negative one and positive one. The techniques support a number representation that is distinguishable from word embedding, can be translated to and from a concrete number, supports an ability to handle a wide range of numbers, and supports an ability to handle subtle changes in numbers with respect to training and testing data sets. The techniques also support a number representation that has a valid distance function between numbers, supports number based arithmetic, enables classification prediction, instead of, or in addition to regression, and supports high noise margins for improved classification.

As discussed in greater detail below in relation to FIGS. 1-3, in some embodiments, a device can detect text comprising any number of words and/or numbers from natural language data. The device can also train a deep neural network to classify the words and numbers. Furthermore, the device can embed, via a word embedding model, the words into separate word related vectors of a vector space and embed the numbers by converting the numbers into separate number related vectors of the vector space. Additionally, the device can train a deep neural network to execute instructions based on the embedded word related vectors and the embedded number related vectors. Furthermore, the device can process an instruction based on the trained deep neural network.

Figure 1:
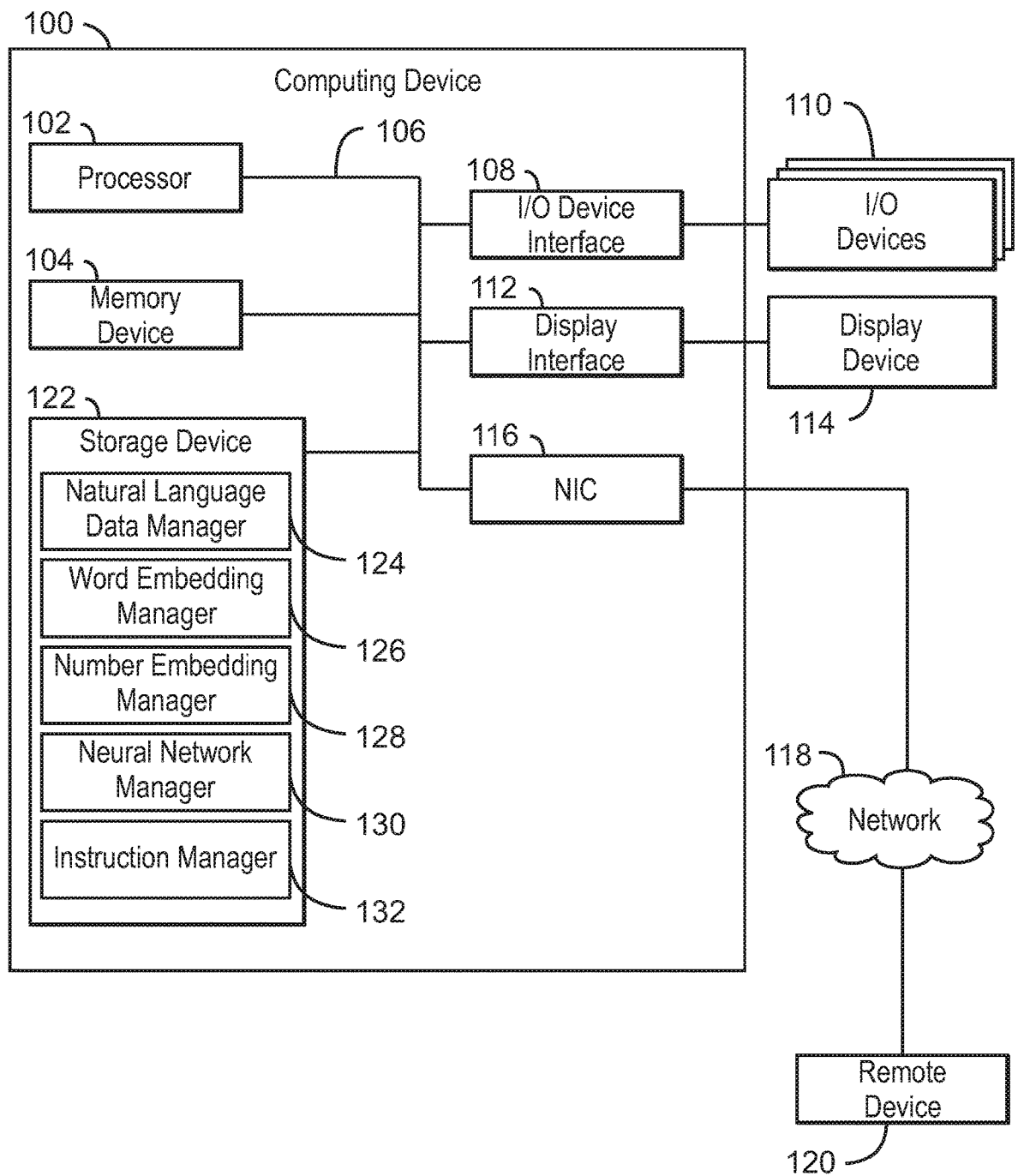
FIG. 1 depicts a block diagram of an example computing system that can execute instructions comprising numerical representations with natural language processing techniques according to an embodiment described herein.

With reference now to FIG. 1, an example computing device is depicted that can execute instructions comprising numerical representations with natural language processing techniques. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote device 120 may connect to the computing device 100 through the network 118.

In some examples, the processor 102 can be linked through the system interconnect 106 to the storage device 122, which can include a natural language data manager 124, a word embedding manager 126, a number embedding manager 128, a neural network manager 130, and an instruction manager 132. In some embodiments, the natural language data manager 124 can detect text comprising any number of words and/or numbers from natural language data. The word embedding manager 126 can embed, via a word embedding model, the words into separate word related vectors of a vector space. In some embodiments, the number embedding manager 128 can embed the numbers by converting the numbers into separate number related vectors of the vector space. Additionally, the neural network manager 130 can train a deep neural network to execute instructions based on the embedded word related vectors and the embedded number related vectors. Furthermore, the instruction manager 132 can process an instruction based on the trained deep neural network.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the natural language data manager 124, word embedding manager 126, number embedding manager 128, neural network manager 130, and instruction manager 132 are partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the natural language data manager 124, word embedding manager 126, number embedding manager 128, neural network manager 130, and instruction manager 132 can be implemented with logic, wherein the logic, as referred to herein, can include any suitable hardware (e.g., a processor, among others), software (e.g., an application, among others), firmware, or any suitable combination of hardware, software, and firmware.

Figure 2:
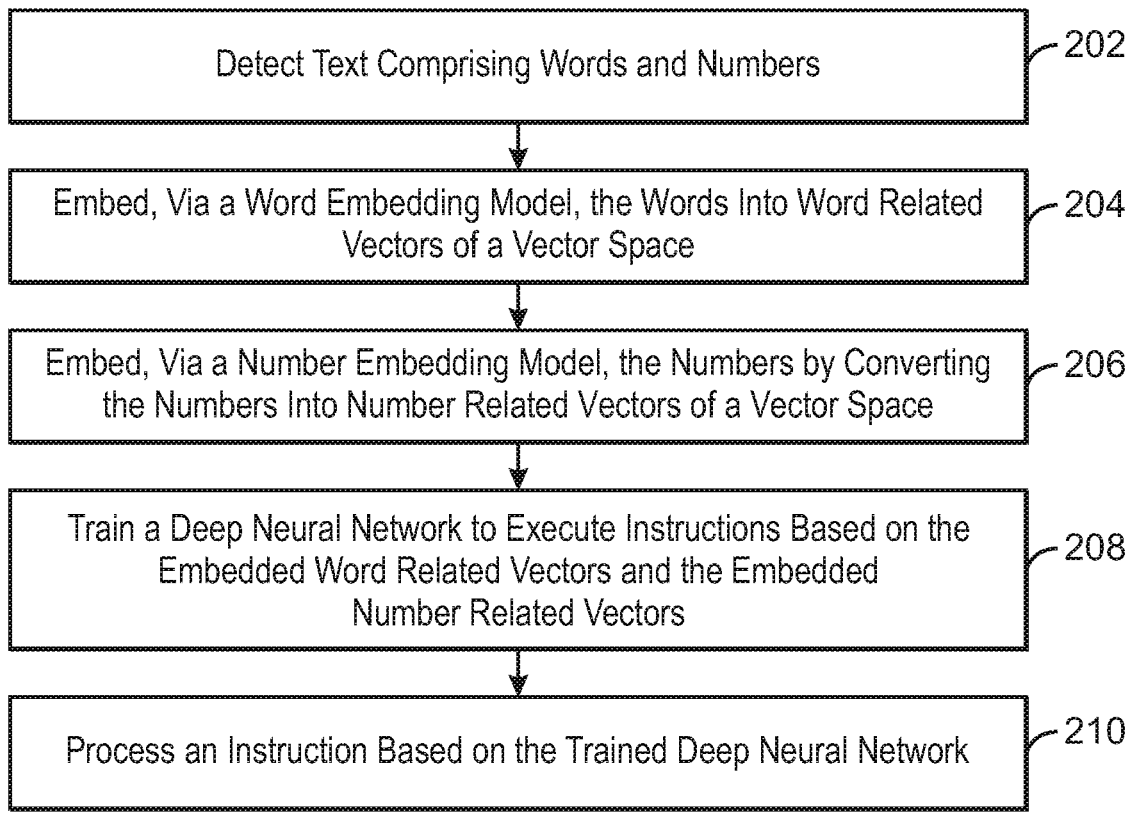
FIG. 2 is a process flow diagram of an example method that can execute instructions comprising numerical representations with natural language processing techniques according to an embodiment described herein.

FIG. 2 is a process flow diagram of an example method that can execute instructions comprising numerical representations with natural language processing techniques. The method 200 can be implemented with any suitable computing device, such as the computing device 100 of FIG. 1.

At block 202, the natural language data manager 124 can detect text comprising words and numbers from natural language data. The natural language data can include any suitable number of alphanumeric strings corresponding to words, numbers, and the like. In some examples, the numbers can include a number expressed in alphabetical characters or numeral based characters such as 0, 1, 2, 3, 4, 5, 6, 7, 8, and 9 of the Arabic numerals. In some embodiments, any suitable numeral system can be recognized such as Roman numerals, Greek numerals, and the like. In some examples, the natural language data can include sentences such as "Is 5.5 greater than 3.2?" "How much is 34 times 2" "Is five greater than three" and "Is a mouse greater than an elephant?"

At block 204, the word embedding manager 126 can embed, via a word embedding model, the words into separate word related vectors of a vector space. In some embodiments, the word embedding model can include any suitable natural language processing technique such as word2vec, among others. The word embedding manager 126 can convert any suitable word into a vector based on characteristics of the word.

At block 206, the number embedding manager 128 can embed the numbers by converting the numbers into separate number related vectors. In some embodiments, the number embedding manager 128 can embed any suitable number belonging to a real set of numbers. Each number can be represented as a thirty-two dimension vector, or any other suitable dimension vector. In some examples, the number related vectors belong to the same vector space as the word related vectors. The number embedding manager 128 can add a redundancy characteristic to the vector based on a factor r. For example, the number embedding manager 128 can duplicate each of the digits of a number r times. In some embodiments, the number embedding manager 128 can include any number of independently generated copies of the number. The number embedding manager 128 can also pad the vector with any suitable number of zeros or any other padding value. For example, the number embedding manager 128 can pad the vector with d−r*32 zeros, wherein d is the recognized digit and r is the number of copies of the digit in the vector. In some embodiments, a zero is represented as a negative zero binary value. In some embodiments, the number embedding manager 128 can add a number of zero values to an end of the vector. In some examples, the number embedding manager 128 can store unit information corresponding to the number at an end of the vector. In some examples, the unit information indicates a currency, a price, a speed, an energy, a date, a metric standard associated with each number, or any combination thereof.

In some embodiments, the number embedding manager 128 can normalize each number. For example, the number embedding manager 128 can allocate each decimal digit representation to a different dimension after dividing the decimal digit representation by ten. Accordingly, the values at each dimension are between 0 and 0.9. In some examples, the number embedding manager 128 can configure the representation to support 50 digits before and 50 digits after the decimal point, or any other suitable number of digits.

In one example, a vector can include any number of copies of the number 5.1, which is detected in text. For example, the vector may include a thirty-two bit binary representation of 5.1 or 01000000 10100011 00110011 00110011, which is repeated seven times for a total of two-hundred and twenty-four bits. In some examples, the vector may belong to a vector space in which each vector is three hundred bits. Accordingly, the remaining seventy-six bits of the three hundred bits can be used for padding values with any suitable compressible value. In some embodiments, the padding value can also include a predetermined number of bits that indicate the unit information described above. In some examples, the thirty-two bit representation of the number 5.1 can be repeated up to nine times so that the total number of bits of the repeated thirty-two bit binary representation is less than three hundred bits. In some embodiments, a total number of bits of each vector can be any suitable number greater than or less than three hundred. Additionally, the number detected in text can alternatively be converted from decimal to a sixty-four bit binary representation.

At block 208, the neural network manager 130 can train a deep neural network to execute instructions based on the embedded word related vectors and the embedded number related vectors. In some embodiments, the neural network manager 130 can classify each number separately. Accordingly, the neural network manager 130 can then predict each of the digits of a number independently. In some examples, the neural network 130 uses a multi-class classification technique to identify each digit of a number rather than using regression. For example, the neural network 130 can predict each digit of a number as a class from a set of digit classes. In some examples, the number embedded by the neural network manager 130 is a floating point number, or a number in any other suitable format. The neural network manager 130 can be trained to identify a number based on the various digits of the number and any operators to be applied to the numbers. For example, the neural network manager 130 can detect that a greater than operator, less than operator, equal operator, or any other operator, is to be applied to the number.

At block 210, the instruction manager 132 can execute or process an instruction based on the trained deep neural network. For example, the instruction manager 130 can execute a mathematical operation comprising any number of operators and numbers. The instruction manager 130 can also execute a mathematical operation based on a recognized number and a number in a non-numeric representation such as a number represented by alphabetical characters.

The process flow diagram of FIG. 2 is not intended to indicate that the operations of the method 200 are to be executed in any particular order, or that all of the operations of the method 200 are to be included in every case. Additionally, the method 200 can include additional operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
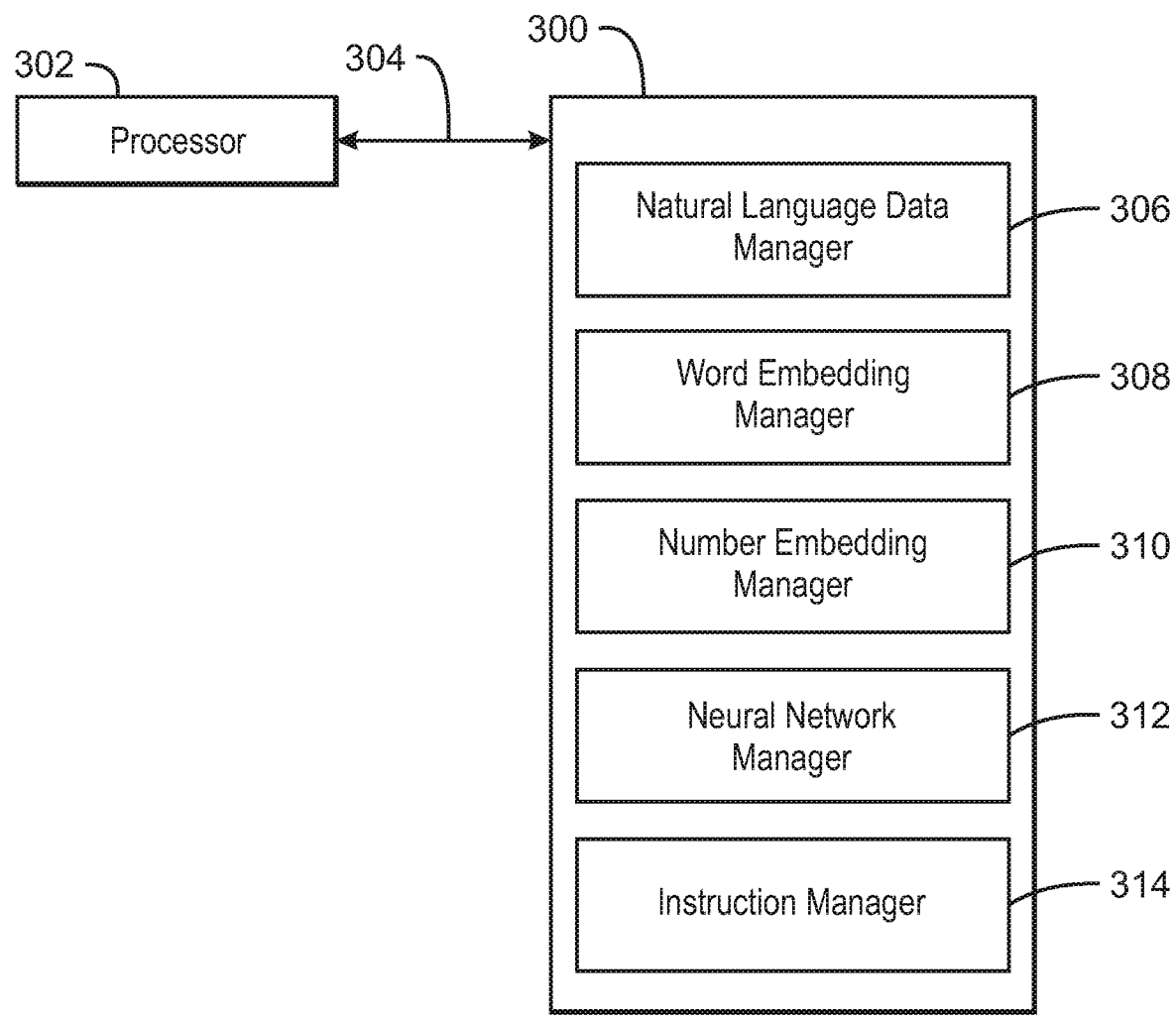
FIG. 3 is a tangible, non-transitory computer-readable medium that can execute instructions comprising numerical representations with natural language processing techniques according to an embodiment described herein.

Referring now to FIG. 3, a block diagram is depicted of an example of a tangible, non-transitory computer-readable medium that can execute instructions comprising numerical representations with natural language processing techniques. The tangible, non-transitory, computer-readable medium 300 may be accessed by a processor 302 over a computer interconnect 304.

Furthermore, the tangible, non-transitory, computer-readable medium 300 may include code to direct the processor 302 to perform the operations of the current method. For example, a natural language data manager 306 can detect text comprising words and/or numbers from natural language data. A word embedding manager 308 can embed, via a word embedding model, the words into separate vectors of a vector space. In some embodiments, a number embedding manager 310 can embed the numbers by converting the numbers into separate number related vectors of the vector space. Additionally, a neural network manager 312 can train a deep neural network to execute instructions based on the embedded word related vectors and the embedded number related vectors. Furthermore, an instruction manager 314 can process an instruction based on the trained deep neural network.

It is to be understood that any number of additional software components not shown in FIG. 3 may be included within the tangible, non-transitory, computer-readable medium 300, depending on the specific application. Furthermore, fewer software components than those shown in FIG. 3 can be included in the tangible, non-transitory, computer-readable medium 300.

Figure 4:
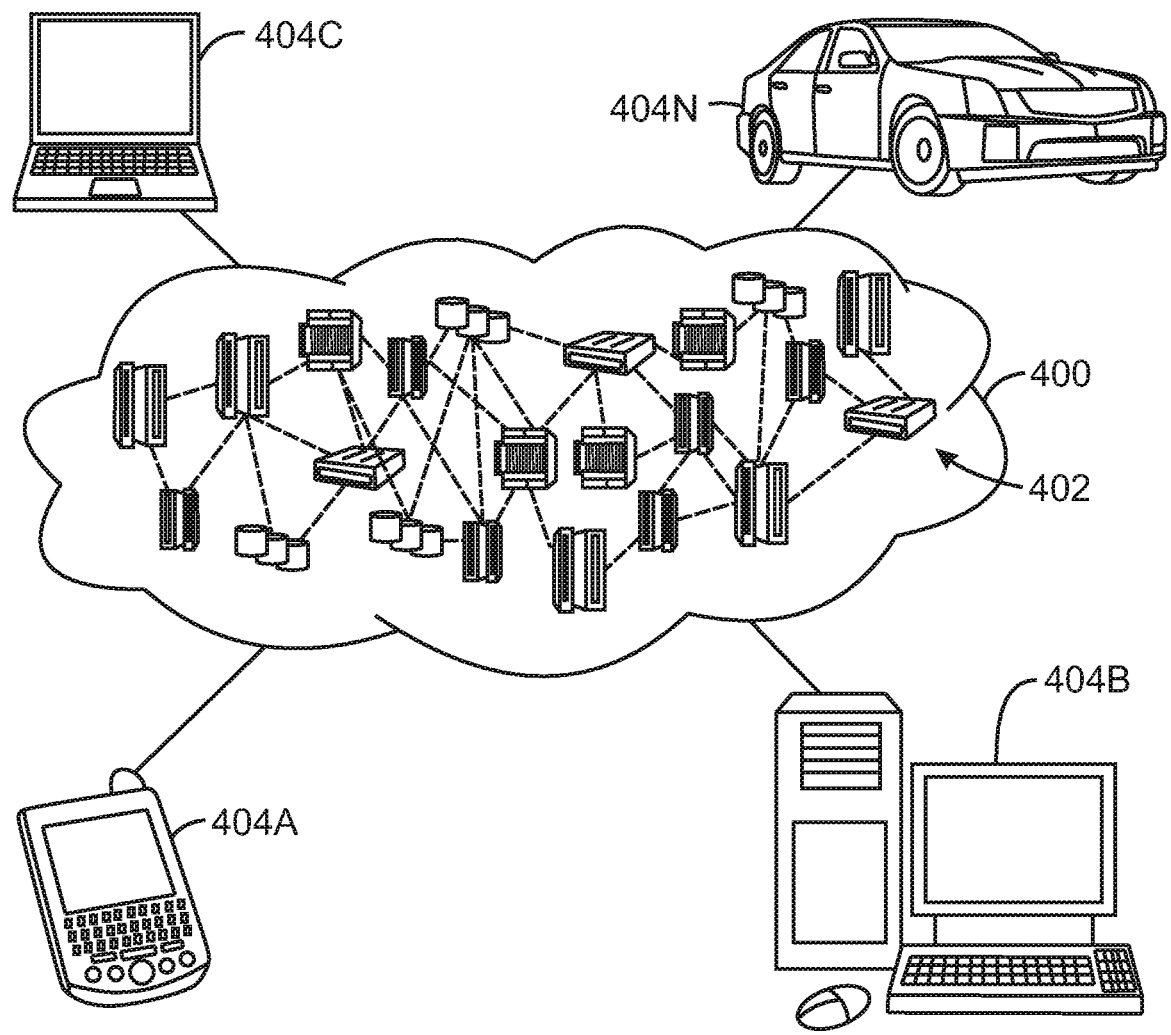
FIG. 4 depicts an illustrative cloud computing environment according to an embodiment described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
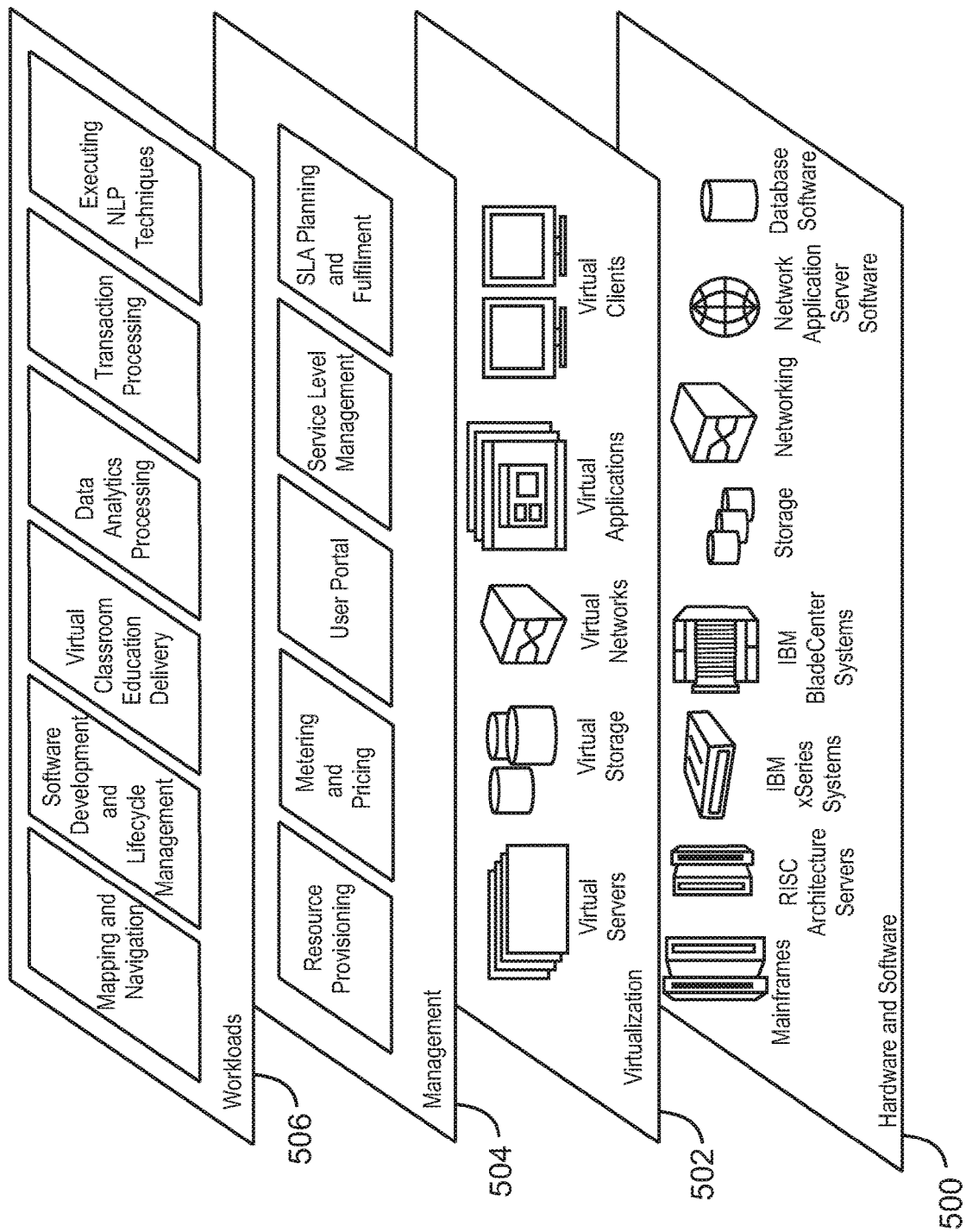
FIG. 5 depicts a set of functional abstraction layers provided by a cloud computing environment according to an embodiment described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and executing natural language processing (NLP) techniques.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for executing natural language processing techniques comprising:
 a processor to:
 detect text comprising a word and a number;
 embed, via a word embedding model, the word into a first vector of a vector space;
 embed, via a number embedding model, the number by converting the number into a second vector of the vector space and adding a number of padding values to an end of the second vector;
 train a deep neural network to execute instructions based on the first embedded vector of the word and the second embedded vector of the number; and
 process an instruction based on the trained deep neural network.

2. The system of claim 1, wherein the text comprises a plurality of words and a plurality of numbers, and wherein the processor is to embed each of the words into separate vectors of the vector space with the word embedding model and embed each of the numbers into separate vectors of the vector space with the number embedding model.

3. The system of claim 1, wherein the processor is to store unit information corresponding to the number at an end of the second vector.

4. The system of claim 1, wherein the processor is to normalize the number of the second vector.

5. The system of claim 1, wherein the number comprises a floating point number represented in a binary format.

6. The system of claim 1, wherein the instruction comprises a mathematical operation based in part on the number and the word.

7. The system of claim 3, wherein the unit information indicates a currency, a price, a speed, an energy, a date, or a metric standard associated with the number.

8. A method for executing natural language processing techniques comprising:
 detecting text comprising a plurality of words and a plurality of numbers;
 embedding, via a word embedding model, each of the words in separate word related vectors of a vector space;
 embedding, via a number embedding model, each of the numbers in separate number related vectors of the vector space, wherein each of the numbers comprises a floating point number represented in a binary format;
 training a deep neural network to execute instructions based on the word related vectors and the number related vectors; and
 processing an instruction based on the trained deep neural network.

9. The method of claim 8, comprising adding a number of padding values to an end of each of the number related vectors.

10. The method of claim 8, comprising storing unit information corresponding to each of the numbers at an end of each of the number related vectors.

11. The method of claim 8, comprising normalizing each of the numbers in the number related vectors.

12. The method of claim 8, wherein the instruction comprises a mathematical operation based in part on the plurality of words and the plurality of numbers.

13. The method of claim 10, wherein the unit information indicates a currency, a price, a speed, an energy, a date, or a metric standard associated with each of the numbers.

14. A computer program product for executing natural language processing techniques comprising a computer readable storage medium having program instructions embodied therewith, wherein the computer readable storage medium is not a transitory signal per se, and wherein the program instructions are executable by a processor to cause the processor to:
 detect text comprising a word and a number;
 embed, via a word embedding model, the word into a first vector of a vector space;

embed, via a number embedding model, the number by converting the number into a second vector of the vector space and normalizing the number of the second vector;

train a deep neural network to execute instructions based on the first embedded vector and the second embedded vector; and process an instruction based on the trained deep neural network.

15. The computer program product of claim 14, wherein the program instructions cause the processor to add a number of padding values to an end of the second vector.

16. The computer program product of claim 14, wherein the program instructions cause the processor to store unit information corresponding to the number at an end of the second vector.

17. The computer program product of claim 14, wherein the text comprises a plurality of words and a plurality of numbers, and wherein the program instructions cause the processor to embed each of the words into separate vectors of the vector space with the word embedding model and embed each of the numbers into separate vectors of the vector space with the number embedding model.

\* \* \* \* \*